Figure 1:
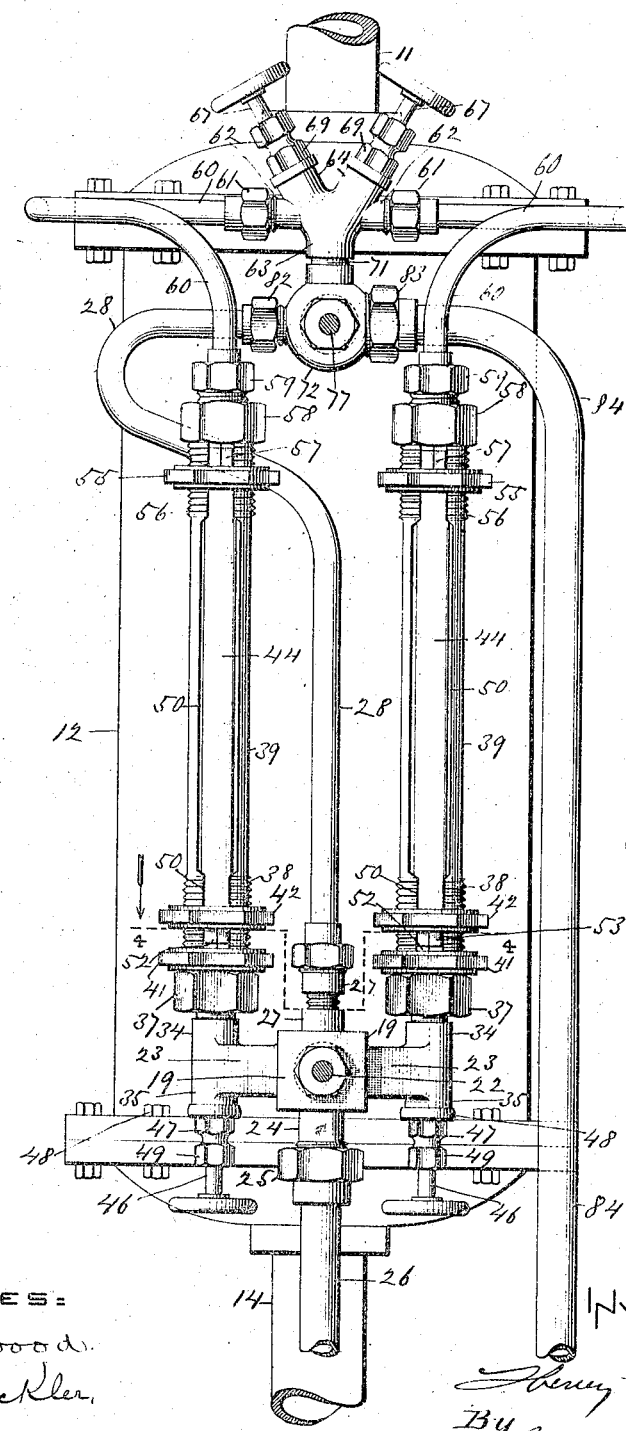

H. R. FAY.
WATER GAGE.
APPLICATION FILED JAN. 30, 1909.

924,050.

Patented June 8, 1909.
3 SHEETS—SHEET 1.

WITNESSES:
M. A. Atwood.
John Buckler.

INVENTOR:
Henry R. Fay
By Henry Williams, Att'y

H. R. FAY.
WATER GAGE.
APPLICATION FILED JAN. 30, 1909.
924,050.
Patented June 8, 1909.
3 SHEETS—SHEET 2.
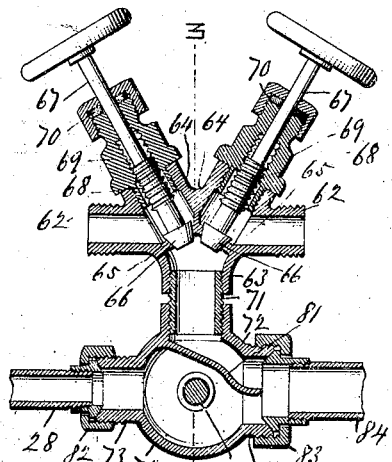
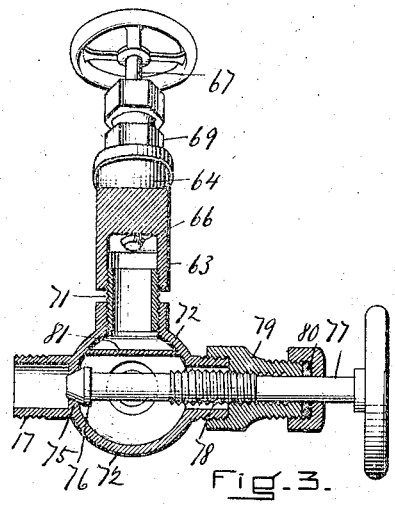
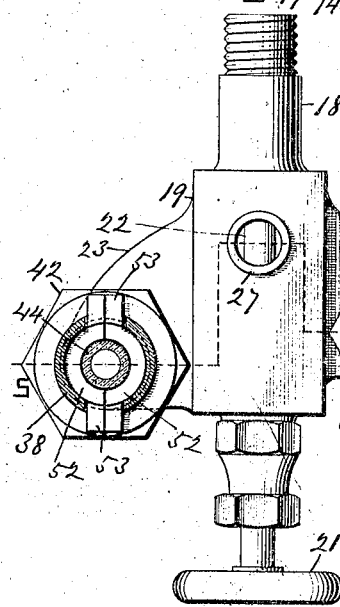
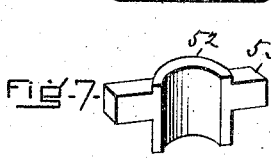
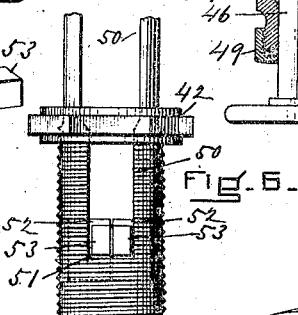

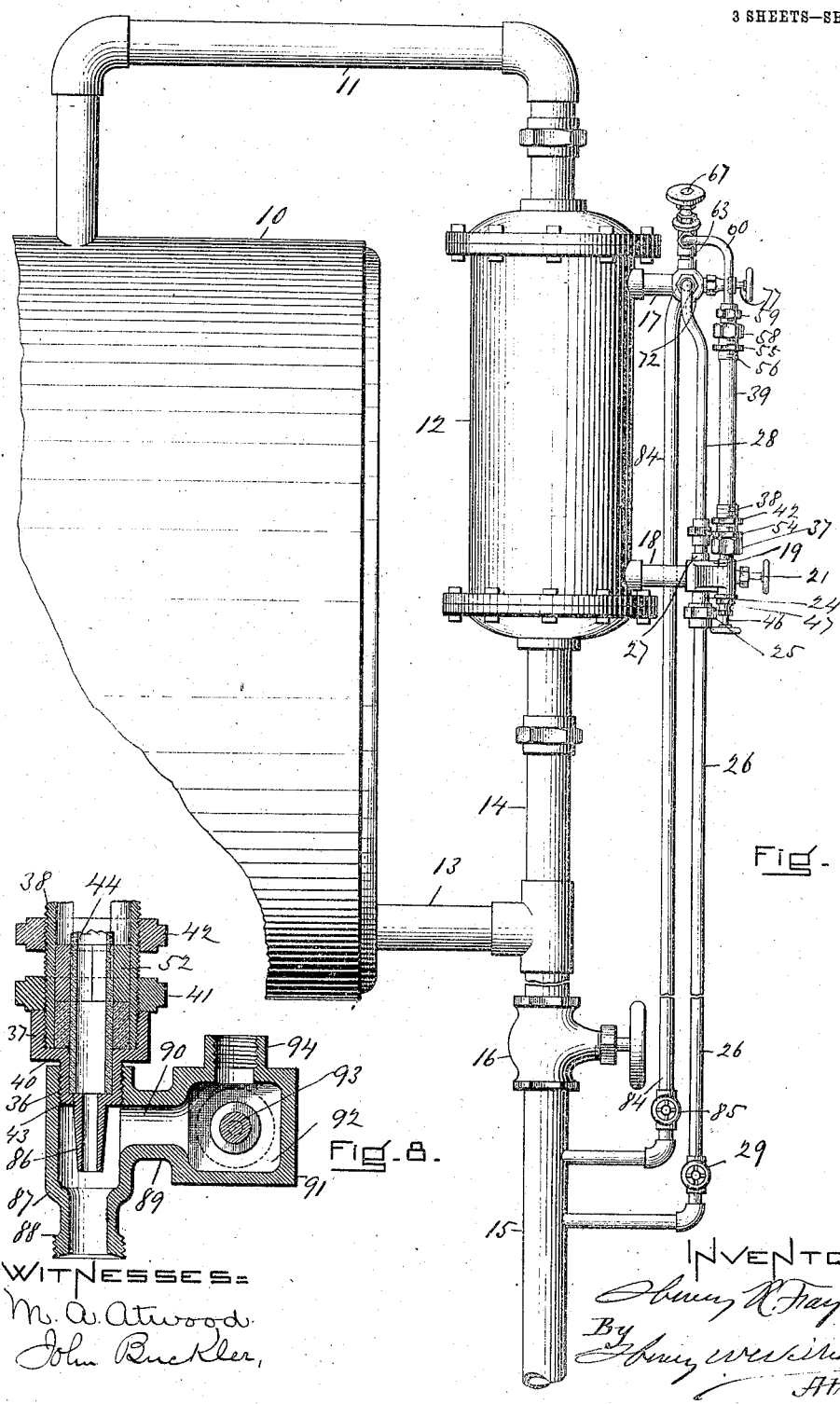

UNITED STATES PATENT OFFICE.

HENRY R. FAY, OF BOSTON, MASSACHUSETTS.

WATER-GAGE.

No. 924,050.

Specification of Letters Patent.

Patented June 8, 1909.

Application filed January 30, 1909. Serial No. 475,216.

*To all whom it may concern:*

Be it known that I, HENRY R. FAY, a citizen of the United States, residing at Boston, in the county of Suffolk and State of Massachusetts, have invented new and useful Improvements in Water-Gages, of which the following is a specification.

This invention relates to water-gages for application to steam boilers, and it consists in a new and improved construction and combination of parts whereby the passages in one or more of the water-glasses employed may be cleared and sediment removed therefrom and from the passages leading thereto by blowing the water up through the glass as well as blowing the steam down; whereby bubbles which are apt to form in the glasses when the boiler is priming or foaming and for various causes, thus interfering with the accuracy of the indication of the water therein, are prevented from entering the glasses; whereby a safely operating glass is provided in connection with which the steam and water-valves can be run fully open; whereby the operator is able to close either the steam or water-valves without being wet or scalded when one or more of the water-glasses are broken, by diverting currents of steam and water from the broken glass; and whereby in other respects the apparatus is rendered more efficient in operation.

The nature of the invention is fully described in detail below, and illustrated in the accompanying drawings, in which:—

Figure 1 is a view in elevation of a double water-gage embodying my invention, valve-stems near the upper and lower end of the device being shown in section. Fig. 2 is an enlarged detail in vertical section showing certain of the connections at the upper end of the water-gage. Fig. 3 is a section taken on line 3—3, Fig. 2. Fig. 4 is an enlarged section taken on line 4—4, Fig. 1, showing the base in plan. Fig. 5 is a section taken on line 5—5, Fig. 4. Fig. 6 is an enlarged detail in elevation of the lower end of one of the metallic slotted tubes which surround the glasses, one of the nuts being removed. Fig. 7 is an enlarged detail in perspective of one of the pair of glands located in and near the lower end of one of the metallic slotted tubes. Fig. 8 is a detail in vertical section of the lower portion of a water-glass and base thereof, illustrating a modification showing the invention, or a part thereof, applied to a water-gage having a single glass. Fig. 9 is a side elevation showing my apparatus connected up to a water-column and boiler, a portion being represented as broken out. In all the figures except Fig. 8 the invention is illustrated as applied to a gage employing two water-glasses.

Similar numerals of reference indicate corresponding parts.

Reference-numeral 10 (Fig. 9) represents one end of an ordinary boiler connected by the pipe 11 to the upper end of the water-column 12 whereby steam is conducted to said column, and connected by the water-pipes 13 and 14 to the lower end of the water-column. 15 represents the blow-off pipe provided at 16 with a suitable regulating valve. 17 is a pipe conducting steam to the water-glass, and 18 is the water-pipe connecting the base of the water-glass with the water-column. All the above parts are constructed substantially as usual.

19 (Figs. 1, 4 and 5) represent the base provided with a chamber 20 with which the water-pipe 18 connects, the water-supply being adapted to be cut off or regulated by the main valve 21 of which 22 is the stem, constructed as usual. The hollow base 19 is provided with two tubular wings 23, preferably integral therewith, and with a downward tubular extension 24. To this downward extension is coupled at 25 one end of a blow-off connecting pipe 26, and to the upper side of the base there is coupled at 27 a bubble-pipe 28, the bubble-pipe opening into the chamber 20 and the blow-off connecting pipe 26 opening into the passage 32 connecting with said chamber and connected at its opposite end with the blow-off pipe 15 below the valve 16 and being provided with a suitable valve 29. The operation of the bubble-pipe is described below. The base and its connections are provided with partitions 30 on opposite sides of the valve-stem 22, said partitions extending from the upper wall of the base down beyond the passages 31 in the branches 23, and into the passage 32 in the portion 24, and being of the shape shown in Fig. 5, whereby a contracted passage is produced from the chamber 20 which narrows into the portion 33 where the partitions extend into the passage 32, said contracted passage opening therefore into the passage 32 at a point considerably below the water-glasses and below the passages 31.

The branches 23 are formed at their outer ends into vertical upwardly and downwardly extending internally screw-threaded portions 34 and 35, each of the portions 34 having screwed into it the lower externally threaded end 36 of a nut whose upper broadened portion 37 has screwed into it the lower externally threaded end 38 of the metallic tube 39 which rests on the shoulder 40 of said nut, as illustrated in Fig. 5. A nut 41 on the threaded tube 39 rests on said broadened threaded portion 37 and a check-nut 42 is also applied to the threaded portion of the tube 39. The lower end of the portion 36 is provided with an internal flange 43 over which is the lower end of the glass 44, and said flange 43 constitutes a seat for a valve 45 whose stem 46 is screwed into an internally threaded nut 47 provided with a flange 48 which bears against the lower end of the portion 35 of the base into which it screws, and is also provided with a suitable cap or stuffing-box 49. The parts above mentioned from 36 to 49 inclusive are the same at opposite ends of the base, and each of the metallic tubes 39 is provided with the usual opposite vertical slots or openings 50 constituting windows. The shape of the lower end of each tube is well illustrated in Figs. 1 and 6, in which it appears that the slots or windows 50 are somewhat narrowed from and below the upper end of the threaded portion 38 and thence extend down to the point 51 (Fig. 6) below which the tube 39 is whole and unslotted. On the bottom of the slot of each tube rest opposite guides or lugs 53 of two halves of a divided gland 52, see Figs. 1, 4, 5, 6 and 7. The curved portions 52 of these glands fit slidingly in the metallic tube 39 and around the glass tube 44 and rest upon the packing 54, as illustrated in Fig. 5 (this packing is omitted in Fig. 6). The guides or lugs 53 of the two halves extend into the slots 50, two lugs extending into each slot, and the nut 42 is adapted to press down the lugs 53 and thus force the divided gland down on the packing 54 around each glass. The upper end of each tube 39 is provided with reversely placed parts similar to those described at the lower end of the tube viz., a nut 55 on the upper threaded end 56 of the tube 39 corresponding with the nut 42 on the lower threaded end 38, glands provided with lugs 57 extending into the upper narrowed end of the slot 50 corresponding with the glands 52, 53, and a nut 58 corresponding with the nut 36, 37. The nut 41 at the lower end is not duplicated at the upper end. Connected by suitable unions 59 with the upper ends of the tubes 39 next the upper ends of the glasses 44 are steam-pipes 60 which connect said glasses by means of suitable unions 61 with the outwardly extending horizontal tubular branches 62 integral with a structure comprising said branches, a downwardly extending branch 63 and upwardly diverging branches 64 which are provided at their lower ends with valve-seats 65 for valves 66 whose stems 67 are threaded at 68 for engagement with nuts 69 suitably packed at 70.

It will be seen by reference to Fig. 2 that the lower portions of the parts 64 are connected with the horizontal pipes 62, and the passages in the valve-seats 65 open into the upper end of the pipe 63, all as indicated in Figs. 1, 2 and 3. The lower end of the pipe 63 is united by a connection 71 with the central globe-shaped casing 72 formed with opposite integral tubular horizontal extensions 73 and 74 and provided at its rear side with a valve-seat 75 which connects with the steam-pipe 17 (Figs. 3 and 9) said seat being for the valve 76 whose stem 77 is threaded at 78 for engagement with a nut 79 suitably packed at 80. A partition 81 extends from the upper portion of the wall of the part 72 next the extension 73 downward substantially diagonally and into the central portion of the extension 74, as shown in Figs. 2 and 3. The bubble-pipe 28 (above mentioned) connects the base at 27 with the extension 73 by means of a suitable union 82. See Figs. 1, 2 and 5. Connected by a suitable union 83 with the opposite extension 74 is a blow-off pipe 84 provided with a suitable valve 85 and opening at its lower end into the blow-off pipe 15 below the valve 16. See Figs. 1, 2 and 9.

In operation, the steam enters the glasses through the steam-pipe 17, the valve-chamber within the case 72, around the edge of the partition 81, up through the connection 71, pipe 63 and the passages in the valve-seats 65 through the lower portions of the chambers in the diverging branches 64 into the opposite branch-pipes 62, and thence through the pipes 60 into the upper ends of the glasses 44—it being understood that the main valve 76, 77, and the twin diverging valves 66, 67 are open. As the diverging valve-mechanisms 66, 67, 69 are entirely independent of each other, it is evident that by leaving one closed the steam can only enter one of the glasses. Hence if either glass is broken or out of condition the other glass can be used, as the ports in the valve-seats 65 open into a passage common to both.

The water-connection is by means of the pipe 18 (the valve 21, 22 being open), the chamber 20 in the base 19, the contracted passage 33, up on opposite sides thereof into the passages 31 and (the two valves 45, 46 being open) through the ports in the valve-seats 43 into the lower ends of the glasses 44. In this case also as at the upper end of the glasses the valves 45 are independent of each other and one or both of them can be open as desired.

It will be noticed that in the present invention the slots 50 in the metallic tubes 38 do not extend to the extreme bottoms of the tubes as in the case of the water-gage illustrated in the United States patent numbered 870,026, granted to me November 5, 1907, but the lower ends of the tubes are unbroken as illustrated in Fig. 6, and in order to provide a suitable gland which may be applied or removed, the divided gland illustrated is employed whereby one half can be applied or removed at a time and the packing 54 firmly pressed down by the pressure on the two portions of the divided gland by the nut 42. The tubes therefore with their unbroken or unslotted ends afford at those points stuffing-boxes for the packing, and the bottoms of the slots prevent the glands from escaping under any circumstances, as they would operate as stops, although practically by reason of the thickness of the packing the glands do not ever seat themselves on the bottoms of the slots.

As above mentioned, the contracted end of the chamber 20 in the base 23 opens at a point considerably below the ports in the valve-seats or flanges 43 and, in fact, considerably below the passages 31 which lead to said ports. If therefore the valve 29 in the blow-off connecting pipe 26, which leads from a point in the base directly under the outlet of the contracted passage 33 into the blow-off pipe 15, were opened the natural course of the water would be down through the pipe 26 into the blow-off pipe 15. When the device is in operation that valve 29, which may be placed at any convenient point in the boiler-room, is, of course closed. But if either glass were to break, that valve could be quickly opened with perfect safety as it would be at a distance from the glasses, and the water would instead of entering and flying out of the broken glass be diverted down through the contracted passage 33 to the pipe 26 until the engineer could get to the water-glass and close the valves 45, 46 connecting with the broken glass. In practice the diameter of the blow-off connecting pipe 26 is always considerably larger than that of the passage 33. It will be seen therefore that by reason of the location of the contracted outlet of the passage 33 below the branch passages 31 and its downwardly pointing direction which is toward the pipe 26, the discharge of the water into the blow-off pipe in case of a broken glass is not only facilitated but rendered certain.

To shut off steam, as when a glass breaks, the valve 85 in the pipe 84 is opened and the steam rushes from the valve-chamber in the portion 72 of the case under the partition 81 into the blow-off pipe 84 and thence through the blow-off pipe 15 to the atmosphere, or elsewhere as it is directed. The valve 66 which corresponds to the glass which is broken is then shut off. Any water which comes up through the bubble-pipe 28 into the chamber in the case 72 drives with the steam above mentioned with accelerated speed through the contracted passage between the lower wall of the pipe 72 and the end of the partition 81 into the blow-off pipe 84.

One of the advantages of the construction of the base and its adjacent parts is that the escape of bubbles in case of priming or foaming or for any other cause is facilitated. As air bubbles must necessarily rise they, after entering the chamber 20 through the water-pipe 18, cannot pass down into and through the passage 33 whose outlet is so far below the passages 31, but must rise through the coupling 27 into the bubble-pipe 28 and pass through it into the pipe 73 and thence into the valve-chamber in the casing 72, and thence they are free to pass through the passage in the valve-seat 75 (the valve 76 being withdrawn therefrom) and through the steam-pipe 17 to the water-column. Thus they are prevented by the funnel-shaped partition 30 from entering the passages 31 and reaching the water-glasses.

By means of this invention it is possible for the purpose of cleaning out the glasses and other passages not only to blow steam down through the passages but to blow the water up through them. To blow steam down, the valve 21, 22 is closed, the valve 29 in the blow-off connecting pipe 26 is opened as are also the valve 76, 77, the valves 66, 67, and the valves 45, 46. The steam passes therefore through the pipe 17, the chamber in the valve-casing 72, the pipes 71 and 63, the passages in the valve-seats 65, the passages in the lower ends of the casings 64, the pipes 62 and the pipes 60 to the glasses, and also through the pipe 73 into the bubble-pipe 28 and down through it and the pipe 27 into the chamber 20 and thence down through the pipe 26 into the blow-off pipe 15.

To force water up for the purpose of cleaning the glasses and passages, the valves 29 and 76, 77 are closed and the valve 21, 22 is opened, as is also the valve 85 in the blow-off connecting pipe 84. The water passes through the pipe 18 into the chamber 20, and thence a portion passes up through the pipe 27, the bubble-pipe 28 and pipe 73 into the valve-chamber in the portion 72, and thence under the edge of the partition 81 into the blow-off connecting pipe 84 which conducts it to the blow-off pipe 15, and a portion of the water passes from the chamber 20 through the passage 33 up through the passages 31 and through the passages in the valve-seats 43 (the valves 45 being open) to the glasses, and thence through the pipes 60 and 62 down through the pipes 63 and 71 into the valve-chamber in the case 72, and thence over the partition 81 into the blow-off connecting pipe 84 and into the blow-off pipe 15.

The water-glasses 44 are shown in Fig. 5 as resting on the flanges 43. In practice they may or may not rest on these flanges, and in fact it is usually better that they should be somewhat raised therefrom for the reason that it is often necessary to rotate the tubes 39 in order that the windows or slots therein may face in a desired direction, such rotation producing rotation of the glasses 44 by means of the packing 54. When the tubes 39 have been rotated to the desired point the nuts 41 (which have been loosened to allow such rotation) are turned down on the upper edges of the portions 37 of the nuts beneath them, and the tubes are thus held at the desired point supporting the glasses usually at a somewhat raised position from the flanges 43.

It is evident that as the operator can divert the currents of steam and water from a broken glass to the blow-off pipe while he is at a distance from the water-gage, the danger of becoming wet or scalded by reason of an accident of this nature is obviated.

In Fig. 8 a detail is shown in which the principle involved in the improved base is illustrated as applied to a water-gage having a single glass. In this figure the water-glass 44, the lower portion 38 of the slotted tube 39, glands 52, nuts 42 and 41, and nut 37, 40, and 36 are constructed as in the other figures in the drawing. The flange 43 of the last-named nut has integral with it a downwardly extending tube or outlet 86 which extends into the portion 87 of the base and opens directly over a downwardly extending tube 88 which corresponds to the tube 24 in the other figures. This portion 87 of the base constitutes a wing corresponding to the portion 34, 35 at one end of the base in the other figures and this wing is connected by the part 89 provided with a passage 90 to the main portion 91. In this construction the water enters the chamber 92 in the main portion 91 and passes through the passage 90 and up through the downwardly extending tube 86 whose mouth is below the passage 90 as the mouth of the passage 33 is below the passages 31 in Fig. 5, so that bubbles cannot enter the glass. The blowing-off operates substantially the same in Fig. 8 as in the other figures, the valve-stem 93 corresponding to the valve-stem 22, and the pipe 94 corresponding to the pipe 27.

Having thus fully described my invention, what I claim, and desire to secure by Letters Patent, is:—

1. In a water-gage, a water-glass; a tubular guard whose lower end is whole and unslotted and adapted to receive packing between its inner surface and the glass, said guard being provided with longitudinal slots or windows above said unslotted end; and a divided gland comprising two longitudinally separated parts fitting slidingly between the glass and the guard next the packing, each part being provided with guides or lugs which extend into the slots or windows in the guard, whereby the two parts of the gland may be applied or removed separately through said slots or windows.

2. In a water-gage, a water-glass; a tubular guard whose opposite ends are whole and unslotted and adapted to receive packing between its inner surface and the glass, said guard being provided with longitudinal slots or windows between said unslotted ends; and divided glands each comprising two longitudinally separated parts fitting slidingly between the glass and the guard next the packing, each part being provided with guides or lugs which extend into the slots or windows in the guard, whereby the two parts of the gland may be applied or removed separately through said slots or windows.

3. In a water-gage, a base provided with upper and lower outlets, the latter outlet being substantially under the former; a water-glass secured to said base; a passage leading from a point near said outlets to a point under the water-glass; a water-inlet; and an internal partition or nipple extending down from the upper wall of the base on opposite sides of the water-inlet to a point below the lower wall in said base, said point being also below the inlet at the lower end of the water-glass and the passage leading thereto, for the purpose set forth.

4. In a water-gage, a base provided with a lower downwardly extending outlet-pipe and a water-inlet; a branch containing a passage and extending substantially horizontally from the point of the water-inlet; a water-glass secured to said branch and connected with the passage therein; and a partition or nipple extending from above the point of the water-inlet down into the downwardly extending pipe and with its lower end opening into said pipe at a point below said passage and also below the lower end of the water-glass, for the purpose set forth.

5. In a water-gage, a base provided with a lower downwardly extending outlet-pipe and a water-inlet; a pair of branches containing passages and extending substantially horizontally from opposite sides of the water-inlet; water-glasses secured to said branches and connected with the passages therein; and a central partition or nipple extending down from the upper wall of the base on opposite sides of the water-inlet and contracting in diameter whereby its lower contracted end opens into said downwardly extending outlet-pipe at a point below the passages and below the lower ends of the water-glasses, for the purpose set forth.

6. In a water-gage, a hollow base provided with a water-inlet; a branch containing a passage and extending substantially horizontally from the point of the water-inlet; a water-glass secured to said branch and connecting with the passage therein; a valve intermediate of said passage and the lower end of the water-glass; a steam-inlet; a valve-controlled steam connection intermediate of the steam-inlet and the upper end of the water-glass; a blow-off pipe connection connecting with the steam inlet; and a bubble-pipe connected at its lower end with the interior of the base and at its upper end with the steam connection at the upper end of the water-glass, for the purpose set forth.

7. In a water-gage, a hollow base provided with a water-inlet; a pair of branches containing passages extending substantially horizontally from opposite sides of the water-inlet; water-glasses secured to said branches and connecting with the passages therein; valves intermediate of the said passages and the lower ends of the water-glasses; a steam-inlet; a valve-controlled steam connection provided with valve-controlled branches which connect with the upper ends of the water-glasses whereby said water-glasses are connected with the steam-inlet; a blow-off pipe connection connecting with the steam-inlet; and a bubble-pipe connected at its lower end with the interior of the base and at its upper end with the steam connection at the upper ends of the water-glasses, for the purpose set forth.

8. In a water-gage, a hollow base provided with a water-inlet; a blow-off pipe; a downwardly extending pipe connecting the interior of said base with the blow-off pipe; a pair of branches containing passages extending substantially horizontally from opposite sides of the water-inlet; water-glasses secured to said branches and connecting with the passages therein; valves intermediate of the said passages and the lower ends of the water-glasses; a steam-inlet; a valve-controlled steam connection provided with valve-controlled branches which connect with the upper ends of the water-glasses whereby said water-glasses are connected with the steam-inlet; a blow-off pipe connection connecting with the steam-inlet; an internal partition or nipple extending down from the upper wall of the base on opposite sides of the water-inlet to a point below the lower wall in said base and into said downwardly extending pipe; and a bubble-pipe connected at its lower end with the chamber in the interior of the base formed by said partition or nipple and at its upper end with the steam connection at the upper ends of the water-glasses, for the purpose set forth.

9. In a water-gage, a hollow base provided with a water-inlet; water-glasses supported by said base; valve-connections connecting the water-glasses with the interior of the base; a casing located centrally above the water-glasses and connected with the steam-supply; a blow-off connecting pipe connected with said casing; a pipe connecting the base with said casing at the opposite end from the blow-off connecting pipe; a partition in the casing extending from above the steam connection substantially diagonally down to a point which is nearly central in the opening of said blow-off connecting pipe; a hollow structure comprising a pair of upwardly diverging branches, outwardly extending horizontal tubular branches, and a central downwardly extending tubular branch having ports opening into the upwardly extending diverging branches; a pair of independent valves one being located in each of the upwardly diverging branches and adapted to open and close said ports; a tubular connection between said downwardly extending branch and said casing and opening into it above said partition; and pipes extending from the valve-chambers in the independent valves to the water-glasses on the corresponding sides, whereby the water may be forced up through the glasses and passages and blown off at the steam end of the water-gage.

In testimony whereof I have signed my name to this specification in the presence of two subscribing witnesses.

HENRY R. FAY.

Witnesses:
  HENRY W. WILLIAMS,
  M. A. ATWOOD.